US010339711B2

(12) United States Patent
Ng-Thow-Hing et al.

(10) Patent No.: US 10,339,711 B2
(45) Date of Patent: Jul. 2, 2019

(54) SYSTEM AND METHOD FOR PROVIDING AUGMENTED REALITY BASED DIRECTIONS BASED ON VERBAL AND GESTURAL CUES

(71) Applicant: Honda Motor Co., Ltd., Tokyo (JP)

(72) Inventors: Victor Ng-Thow-Hing, Sunnyvale, CA (US); Cuong Tran, Santa Clara, CA (US); Karlin Bark, Menlo Park, CA (US)

(73) Assignee: Honda Motor Co., Ltd., Tokyo (JP)

( * ) Notice: Subject to any disclaimer, the term of this patent is extended or adjusted under 35 U.S.C. 154(b) by 598 days.

(21) Appl. No.: 14/515,620

(22) Filed: Oct. 16, 2014

(65) Prior Publication Data

US 2015/0062168 A1 Mar. 5, 2015

Related U.S. Application Data

(63) Continuation-in-part of application No. 14/465,049, filed on Aug. 21, 2014, now Pat. No. 9,747,898, and (Continued)

(51) Int. Cl.
*G06F 3/01* (2006.01)
*B60K 35/00* (2006.01)
(Continued)

(52) U.S. Cl.
CPC ............ *G06T 19/006* (2013.01); *B60K 35/00* (2013.01); *G02B 27/01* (2013.01); (Continued)

(58) Field of Classification Search
CPC .......... G05G 2009/0477; G05G 9/047; H01H 2003/008; A63F 2300/1025; G06F 3/16; (Continued)

(56) References Cited

U.S. PATENT DOCUMENTS 5,051,735 A 9/1991 Furukawa
5,115,398 A 5/1992 De Jong
(Continued)

FOREIGN PATENT DOCUMENTS

CN 103129466 6/2013
DE 10130046 1/2003
(Continued)

OTHER PUBLICATIONS

Office Action of U.S. Appl. No. 14/321,105 dated Mar. 1, 2017, 26 pages.
(Continued)

*Primary Examiner* — Jason A Pringle-Parker
(74) *Attorney, Agent, or Firm* — Rankin, Hill & Clark LLP

(57) ABSTRACT

A method and system for providing augmented reality based directions. The method and system include receiving a voice input based on verbal cues provided by one or more vehicle occupants in a vehicle. The method and system also include receiving a gesture input and a gaze input based on gestural cues and gaze cues provided by the one or more vehicle occupants in the vehicle. The method and system additionally include determining directives based on the voice input, the gesture input and the gaze input and associating the directives with the surrounding environment of the vehicle. Additionally, the method and system include generating augmented reality graphical elements based on the directives and the association of the directives with the surrounding environment of the vehicle. The method and system further include displaying the augmented reality graphical elements on a heads-up display system of the vehicle.

20 Claims, 6 Drawing Sheets

Related U.S. Application Data a continuation-in-part of application No. 14/463,618, filed on Aug. 19, 2014, now Pat. No. 9,393,870, and a continuation-in-part of application No. 14/460,478, filed on Aug. 15, 2014, now Pat. No. 9,400,385, and a continuation-in-part of application No. 13/832,918, filed on Mar. 15, 2013, now Pat. No. 9,164,281.

(51) Int. Cl.

| | |
|---|---|
| G02B 27/01 | (2006.01) |
| G02B 19/00 | (2006.01) |
| G10L 15/20 | (2006.01) |
| G10L 15/22 | (2006.01) |
| G06T 19/00 | (2011.01) |

(52) U.S. Cl.
CPC ....... *G02B 27/0101* (2013.01); *G02B 27/017* (2013.01); *G06F 3/013* (2013.01); *G06F 3/017* (2013.01); *G10L 15/20* (2013.01); *G10L 15/22* (2013.01); *B60K 2350/2052* (2013.01); *B60R 2300/308* (2013.01); *G02B 2027/014* (2013.01); *G02B 2027/0127* (2013.01); *G02B 2027/0187* (2013.01); *G10L 2015/226* (2013.01)

(58) Field of Classification Search
CPC .............. G06F 3/04845; G06F 11/079; G06F 11/0727; G02B 27/0093; G02B 2027/014; G02B 2027/0159; G10L 2015/226; G06T 19/006; G09G 3/003; H04L 63/0407; H04L 63/102
USPC ........................................ 345/633
See application file for complete search history.

(56) References Cited

U.S. PATENT DOCUMENTS

| | | | |
|---|---|---|---|
| 5,368,309 | A | 11/1994 | Monroe et al. |
| 5,440,428 | A | 8/1995 | Hegg et al. |
| 5,519,536 | A | 5/1996 | Hoehn |
| 6,222,583 | B1 | 4/2001 | Matsumura et al. |
| 6,285,317 | B1 | 9/2001 | Ong |
| 6,574,555 | B2 | 6/2003 | Mochizuki et al. |
| 6,708,087 | B2 | 3/2004 | Matsumoto |
| 6,735,517 | B2 | 5/2004 | Engelsberg et al. |
| 6,774,772 | B2 | 8/2004 | Hahn |
| 6,947,064 | B1 | 9/2005 | Hahn et al. |
| 7,124,027 | B1 | 10/2006 | Ernst |
| 7,190,260 | B2 | 3/2007 | Rast |
| 7,216,035 | B2 | 5/2007 | Hortner et al. |
| 7,379,813 | B2 | 5/2008 | Kubota |
| 7,519,471 | B2 | 4/2009 | Shibata et al. |
| 7,565,230 | B2 | 7/2009 | Gardner et al. |
| 7,627,419 | B2 | 12/2009 | Yoshida |
| 7,647,170 | B2 | 1/2010 | Sawaki et al. |
| 7,783,422 | B2 | 8/2010 | Tanaka |
| 7,815,313 | B2 | 10/2010 | Ito et al. |
| 7,920,102 | B2 | 4/2011 | Breed |
| 8,135,536 | B2 | 3/2012 | Matsunaga et al. |
| 8,208,208 | B2 | 6/2012 | Schwab |
| 8,305,444 | B2 | 11/2012 | Hada |
| 8,352,181 | B2 | 1/2013 | Hagiwara |
| 8,358,224 | B2 | 1/2013 | Seder et al. |
| 8,406,990 | B2 | 3/2013 | Barkowski et al. |
| 8,411,245 | B2 | 4/2013 | Lee et al. |
| 8,620,575 | B2 | 12/2013 | Vogt et al. |
| 8,633,810 | B2 | 1/2014 | Luo et al. |
| 8,633,979 | B2 | 1/2014 | Szczerba et al. |
| 8,660,735 | B2 | 2/2014 | Tengler et al. |
| 8,686,872 | B2 | 4/2014 | Szczerba et al. |
| 8,686,922 | B2 | 4/2014 | Breed |
| 8,725,342 | B2 | 5/2014 | Ferguson et al. |
| 2004/0193347 | A1 | 9/2004 | Harumoto et al. |
| 2005/0004723 | A1 | 1/2005 | Duggan et al. |
| 2005/0071082 | A1 | 3/2005 | Ohmura et al. |
| 2005/0195383 | A1 | 9/2005 | Breed et al. |
| 2006/0116816 | A1 | 6/2006 | Chao et al. |
| 2006/0262140 | A1 | 11/2006 | Kujawa et al. |
| 2007/0087756 | A1 | 4/2007 | Hoffberg |
| 2007/0185644 | A1 | 8/2007 | Hirose |
| 2008/0046150 | A1 | 2/2008 | Breed |
| 2008/0318676 | A1 | 12/2008 | Ham |
| 2009/0005961 | A1 | 1/2009 | Grabowski et al. |
| 2009/0210257 | A1 | 8/2009 | Chalfant et al. |
| 2009/0268946 | A1 | 10/2009 | Zhang et al. |
| 2010/0027768 | A1 | 2/2010 | Foskett |
| 2010/0131188 | A1 | 5/2010 | Yeh et al. |
| 2010/0192110 | A1 | 7/2010 | Carter et al. |
| 2010/0201894 | A1 | 8/2010 | Nakayama et al. |
| 2010/0253349 | A1 | 10/2010 | Seder et al. |
| 2010/0253492 | A1 | 10/2010 | Seder et al. |
| 2010/0253541 | A1* | 10/2010 | Seder .................. G01S 13/723 340/905 |
| 2010/0253601 | A1 | 10/2010 | Seder et al. |
| 2010/0274480 | A1 | 10/2010 | McCall et al. |
| 2010/0292886 | A1 | 11/2010 | Szczerba et al. |
| 2010/0332266 | A1 | 12/2010 | Tamir et al. |
| 2011/0018903 | A1 | 1/2011 | Lapstun et al. |
| 2011/0022393 | A1 | 1/2011 | Wäller et al. |
| 2011/0052042 | A1 | 3/2011 | Ben Tzvi |
| 2011/0075257 | A1 | 3/2011 | Hua et al. |
| 2011/0093190 | A1 | 4/2011 | Yoon |
| 2011/0093790 | A1 | 4/2011 | Yoon |
| 2011/0106428 | A1 | 5/2011 | Park et al. |
| 2011/0199376 | A1 | 8/2011 | Saleman |
| 2011/0251768 | A1 | 10/2011 | Luo et al. |
| 2012/0019557 | A1 | 1/2012 | Aronsson et al. |
| 2012/0041632 | A1 | 2/2012 | Bordes |
| 2012/0072105 | A1 | 3/2012 | Feyereisen et al. |
| 2012/0083964 | A1 | 4/2012 | Montemerlo et al. |
| 2012/0109521 | A1 | 5/2012 | Rothschild |
| 2012/0154441 | A1 | 6/2012 | Kim |
| 2012/0162255 | A1 | 6/2012 | Ganapathy et al. |
| 2012/0173069 | A1 | 7/2012 | Tsimhoni et al. |
| 2012/0212405 | A1 | 8/2012 | Newhouse et al. |
| 2012/0224060 | A1 | 9/2012 | Gurevich et al. |
| 2012/0249589 | A1 | 10/2012 | Gassner et al. |
| 2012/0263154 | A1* | 10/2012 | Blanchflower ... G06F 17/30247 370/338 |
| 2012/0268351 | A1 | 10/2012 | Sasaki et al. |
| 2012/0283942 | A1 | 11/2012 | T'Siobbel et al. |
| 2012/0287284 | A1 | 11/2012 | Jacobsen |
| 2012/0310531 | A1 | 12/2012 | Agarwal et al. |
| 2013/0050258 | A1 | 2/2013 | Liu et al. |
| 2013/0083291 | A1 | 4/2013 | Smithwick et al. |
| 2013/0151145 | A1 | 6/2013 | Ishikawa |
| 2013/0158778 | A1* | 6/2013 | Tengler ............ G08G 1/096716 701/31.5 |
| 2013/0261871 | A1 | 10/2013 | Hobbs et al. |
| 2013/0262997 | A1 | 10/2013 | Markworth et al. |
| 2013/0293582 | A1 | 11/2013 | Ng-Thow-Hing et al. |
| 2014/0005857 | A1 | 1/2014 | Heisterkamp |
| 2014/0019913 | A1 | 1/2014 | Newman et al. |
| 2014/0036374 | A1 | 2/2014 | Lescure et al. |
| 2014/0063064 | A1 | 3/2014 | Seo et al. |
| 2014/0114845 | A1 | 4/2014 | Rogers et al. |
| 2014/0121883 | A1 | 5/2014 | Shen |
| 2014/0139524 | A1 | 5/2014 | Nilsson et al. |
| 2014/0267263 | A1 | 9/2014 | Beckwith et al. |
| 2014/0267398 | A1 | 9/2014 | Beckwith et al. |
| 2015/0226570 | A1 | 8/2015 | Takei et al. |

FOREIGN PATENT DOCUMENTS

| | | |
|---|---|---|
| DE | 10131720 | 1/2003 |
| DE | 102006008981 | 8/2007 |
| DE | 102012210145 | 7/2009 |
| DE | 102008040467 | 1/2010 |
| DE | 102008042734 | 4/2010 |
| DE | 102009045169 | 3/2011 |
| DE | 102012221762 | 6/2013 |
| EP | 1862988 | 11/2009 |

(56) References Cited

FOREIGN PATENT DOCUMENTS

| | | |
|---|---|---|
| EP | 2618108 | 7/2013 |
| JP | 8-197982 | 8/1996 |
| JP | 8197981 | 8/1996 |
| JP | 2005128607 | 5/2005 |
| JP | 2006284458 | 10/2006 |
| JP | 2006309552 | 11/2006 |
| JP | 2007017340 | 1/2007 |
| JP | 2007200274 | 8/2007 |
| JP | 2007333995 | 12/2007 |
| JP | 2009007087 | 1/2009 |
| JP | 2009-288388 | 12/2009 |
| JP | 2012058689 | 3/2012 |
| JP | 2012508933 | 4/2012 |
| JP | 201324921 | 2/2013 |
| WO | 2010040589 | 4/2010 |
| WO | 2011108091 | 9/2011 |

OTHER PUBLICATIONS

Office Action of U.S. Appl. No. 14/465,049 dated Dec. 23, 2016, 30 pages.
Office Action of U.S. Appl. No. 14/856,596 dated Jan. 27, 2017, 26 pages.
Young-Woo (http://www.cs.cmu.edu/~youngwoo/research.html, Sep. 24, 2006), 5 pages.
Office Action of U.S. Appl. No. 14/856,596 dated Jan. 4, 2018, 31 pages.
Office Action of Japanese Serial No. 2014-048389 dated Nov. 21, 2017, 12 pages.
English version of Office Action of Japanese Serial No. 2014-048389 dated Nov. 21, 2017, 9 pages.
Office Action of U.S. Appl. No. 14/041,614 dated Feb. 3, 2016, 45 pages.
Office Action of U.S. Appl. No. 14/460,478 dated Feb. 8, 2016, 70 pages.
Office Action of U.S. Appl. No. 14/856,596 dated Jan. 15, 2016, 36 pages.
Office Action of U.S. Appl. No. 14/321,105 dated Apr. 20, 2016, 37 pages.
Office Action of U.S. Appl. No. 14/460,478 dated Apr. 25, 2016, 18 pages.
Office Action of U.S. Appl. No. 13/832,209 dated Jul. 16, 2015, 37 pages.
Office Action of U.S. Appl. No. 14/465,049 dated Nov. 19, 2015, 63 pages.
Office Action of U.S. Appl. No. 13/832,209 dated Jan. 30, 2015, 26 pages.
Office Action of U.S. Appl. No. 13/832,918 dated Jan. 2, 2015.
MVS California, 2_Working_Demo.mov, YouTube, May 16, 2011, http://www.youtube.com/watch?v=pdtcyaF6bTI.
Autoblog, GM's Full-Windshield HUD Technology | Autoblog, YouTube, Mar. 17, 2010, http://www.youtube.com/watch?v=wR5EAGM4-U&feature=youtu.be&t=1m15s.
Office Action of U.S. Appl. No. 14/041,614 dated Dec. 23, 2014.
Office Action of U.S. Appl. No. 14/041,614 dated May 6, 2015.
Office Action of U.S. Appl. No. 14/321,105 dated Sep. 1, 2016, 29 pages.
Office Action of U.S. Appl. No. 14/856,596 dated Sep. 15, 2016, 33 pages.
Office Action of U.S. Appl. No. 14/041,614 dated Aug. 6, 2015, 21 pages.
Office Action of U.S. Appl. No. 14/463,618 dated Feb. 23, 2016, 58 pages.
Office Action of U.S. Appl. No. 14/465,049 dated Feb. 24, 2016, 31 pages.
Search Report of DE Application No. 102014219575.6 dated Dec. 16, 2015, 12 pages.
Examination Report of DE Application No. 102014219575.6 dated Dec. 17, 2015, 10 pages.
Office Action of U.S. Appl. No. 13/832,918 dated May 8, 2015.
Article: Tai, et al.: "Bridging the Communication Gap: A Driver-Passenger Video Link", dated Apr. 15, 2010 https://www.pervasive.wiwi.uni-due.de/uploads/tx_itochairt3/publications/Bridging_the_Communication_Gap-MC2009-GraceTai_01.pdf.
Website: "Future Car Technologies" dated Dec. 19, 2013 http://www.carcoversdirect.com/car-lovers/resources/fact-friday/future-car-technologies/#.U3uVbPldVJ1.
Notice of Allowance of U.S. Appl. No. 15/162,836 dated Jul. 28, 2016, 32 pages.
Office Action of U.S. Appl. No. 14/465,049 dated Aug. 9, 2016, 27 pages.
Website: "BMW Technology Guide: Adaptive Brake Assistant" http://www.bmw.com/com/en/insights/technology/technology_guide/articles/adaptive_brake_assistant.html, printed Oct. 17, 2014.
Website: "Adaptive Cruise Control and Collision Warning with Brake Support" http://corporate.ford.com/doc/Adaptive_Cruise.pdf, Jul. 2012.
Article: Alves, P.R., et al.: "Forward collision warning systems using heads-up displays: Testing usability of two new metaphors", Intelligent Vehicles Symposium (IV), 2013 IEEE, pp. 1-6,http://ieeexplore.ieee.org/xpl/login.jsp?tp=&arnumber=6629438&url=http%3A%2F%2Fieeexplore.ieee.org%2Fstamp%2Fstamp.jsp%3Ftp%3D%26arnumber%3D6629438.
Article: Ho, C., et al.: "Multisensory in-car warning signals for collision avoidance.", Human Factors: The Journal of the Human Factors and Ergonomics Society, 49(6), 1107-1114, Dec. 2007, http://www.ncbi.nlm.nih.gov/pubmed/18074709.
Article: Gray, R., et al.: "A Comparison of Different Informative Vibrotactile Forward Collision Warnings: Does the Warning Need to Be Linked to the Collision Event?", PloS One, 9(1), e87070,Jan. 27, 2014. http://www.plosone.org/article/info%3Adoi%2F10.1371%2Fjournal.pone.0087070.
Office Action of U.S. Appl. No. 14/321,105 dated Sep. 24, 2015, 37 pages.
Search Report of Chinese Serial No. 201410514641.9 dated Jun. 14, 2018, 2 pages.

\* cited by examiner

SYSTEM AND METHOD FOR PROVIDING AUGMENTED REALITY BASED DIRECTIONS BASED ON VERBAL AND GESTURAL CUES

CROSS-REFERENCE TO RELATED APPLICATIONS

This application is a continuation-in-part of, and claims priority to, U.S. application Ser. No. 14/465,049, filed on Aug. 21, 2014; U.S. application Ser. No. 14/463,618, filed on Aug. 19, 2014; U.S. application Ser. No. 14/460,478, filed on Aug. 15, 2014; and U.S. application Ser. No. 13/832,918, filed on Mar. 15, 2013, the entire applications of which are incorporated herein by reference.

BACKGROUND

Vehicle passengers often communicate requests, commands, and statements to drivers to inform them of directions, landmarks, obstacles, and other information that may apply during the course of driving the vehicle. Often, vehicle passengers use gestures such as pointing towards an object and/or in a direction that is located in view from the vehicle windshield. Passengers also communicate these gestures with spoken comments that direct the driver to the object and/or in the direction that is being represented by the passenger's gesture. In many instances, the passenger points to a specific location and the driver may not clearly see what the passenger is communicating without looking away from the roadway in front of the driver. Furthermore, the driver may not clearly understand the passenger's directions as they may be ambiguous based on the limited amount of time the driver has to safely follow the passenger's directional cues. As a result, in attempting to understand the passenger's directives, the driver may be distracted by having to look away from the roadway to determine what directive or information the passenger is attempting to communicate.

BRIEF DESCRIPTION

According to one aspect, a method for providing augmented reality based directions is provided. The method may include receiving a voice input based on verbal cues provided by one or more vehicle occupants in a vehicle. The method may also include receiving a gesture input and a gaze input based on gestural cues and gaze cues provided by the one or more vehicle occupants in the vehicle. Additionally, the method may include determining directives based on the voice input, the gesture input and the gaze input and associating the directives with the surrounding environment of the vehicle. Additionally, the method may include generating augmented reality graphical elements based on the directives and the association of the directives with the surrounding environment of the vehicle. The method may further include displaying the augmented reality graphical elements on a heads-up display system of the vehicle.

According to another aspect, a system for providing augmented reality based is provided. The system may include a voice recognition subsystem that provides a voice input based on verbal cues provided by one or more vehicle occupants in a vehicle. The system may also include a gesture recognition subsystem that provides a gesture input and a gaze input based on gestural cues and gaze cues provided by the one or more occupants in the vehicle. Additionally, the system may include a command interpreter that determines directives based on the voice input provided by the voice recognition subsystem, and the gesture input and the gaze input provided by the gesture recognition subsystem and associates the directives with the surrounding environment of the vehicle. The command interpreter generates augmented reality graphical elements based on the directives and the association of the directives with the surrounding environment of the vehicle The system may further include a heads up display system that displays augmented reality graphical elements generated by the command interpreter.

According to still another aspect, a computer readable medium is provided having instructions that when executed by a processor executes a method for providing augmented reality based directions. The instructions may include receiving a voice input based on verbal cues provided by one or more vehicle occupants in a vehicle. The instructions may also include receiving a gesture input and a gaze input based on gestural cues and gaze cues provided by the one or more vehicle occupants in the vehicle. Additionally, the instructions may include determining directives based on the voice input, the gesture input and the gaze input and associating the directives with the surrounding environment of the vehicle. Additionally, the instructions may include generating augmented reality graphical elements based on the directives and the association of the directives with the surrounding environment of the vehicle. The instructions may further include displaying the augmented reality graphical elements on a heads-up display system of the vehicle.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
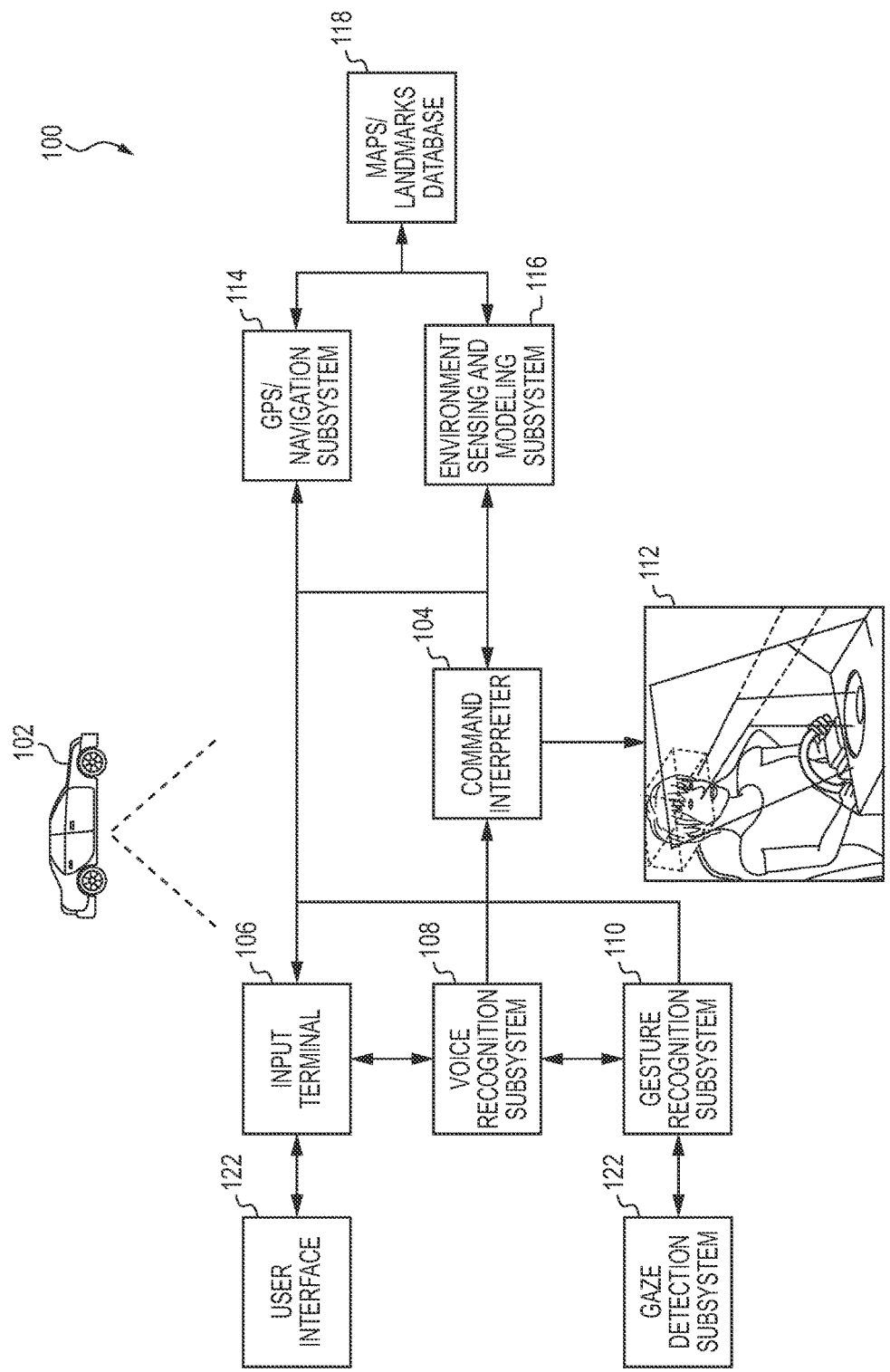
FIG. 1 is a schematic view of an exemplary system for providing augmented reality based directions based on verbal and gestural cues according to an aspect of the present application.

The following includes definitions of selected terms employed herein. The definitions include various examples and/or forms of components that fall within the scope of a term and that can be used for implementation. The examples are not intended to be limiting.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database", as used herein can refer to table, a set of tables, a set of data stores and/or methods for accessing and/or manipulating those data stores. Some databases can be incorporated with a disk as defined above.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action (s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications can be sent and/or received. An operable connection can include a wireless interface, a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers. In some embodiments, a "portable device" could refer to a remote device that includes a processor for computing and/or a communication interface for receiving and transmitting data remotely.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "vehicle system", as used herein can include, but is not limited to, any automatic or manual systems that can be used to enhance the vehicle, driving and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

A "vehicle occupant", as used herein can include, but is not limited to, one or more biological beings located in the vehicle. The vehicle occupant can be a driver or a passenger of the vehicle. The vehicle occupant can be a human (e.g., an adult, a child, an infant) or an animal (e.g., a pet, a dog, a cat).

A "wearable computing device", as used herein can include, but is not limited to, a computing device component (e.g., a processor) with circuitry that can be worn or attached to user. In other words, a wearable computing device is a computer that is subsumed into the personal space of a user. Wearable computing devices can include a display and can include various sensors for sensing and determining various parameters of a user. For example, location, motion, and physiological parameters, among others. Some wearable computing devices have user input and output functionality. Exemplary wearable computing devices can include, but are not limited to, watches, glasses, clothing, gloves, hats, shirts, jewelry, rings, earrings necklaces, armbands, shoes, earbuds, headphones, personal wellness devices, collars, and leashes.

Referring now to the drawings, wherein the showings are for purposes of illustrating one or more exemplary embodiments and not for purposes of limited the same, FIG. 1 is a schematic view of a system for providing augmented reality directions based on verbal and gestural cues according to an exemplary embodiment. The system, which may also be referred to as an instruction assisted direction system, is generally designated by reference numeral 100. The components included within the system 100 may be interconnected via one or more system buses. It will be understood that FIG. 1 constitutes, in some respects, an abstraction and that the actual organization of the components of the system 100 may be more complex than illustrated. As used herein, the term "subsystem" may refer to both co-resident subsystems (subsystems that utilize the same processor or other hardware as another subsystem) and external subsystems (subsystems that utilize hardware that is separate from other subsystems). In one embodiment, the system 100 is centered around vehicle 102 that includes a heads up display system (HUD system) 112 that may include a heads up display device (HUD device) (not shown in FIG. 1).

The system 100 additionally includes a command interpreter 104 that is utilized to translate input information from virtually any group of input subsystems into instructions for virtually any group of "output" systems, such as the HUD system 112. The various subsystems disclosed are examples illustrating the various utilities of the command interpreter 104 and are not intended to be limiting. The command interpreter 104 receives data inputs, generates data outputs, and subsequently translates the generated data outputs into system instructions for HUD system 112. For example, the command interpreter 104 may utilize multimodal principals and sensor fusion to utilize available information of many different types to data inputs in order to generate augmented reality graphical elements as data outputs. The command interpreter 104 may send the one or more instructions to the HUD system 112 to display the augmented reality graphical elements.

The command interpreter 104 may receive input from an input terminal 106, a voice recognition subsystem 108, a gesture recognition subsystem 110, a GPS/navigation subsystem 114, and an environment sensing and modeling subsystem 116. The input terminal 106 may include a display screen that includes a user interface 120. The user interface 120 may communicate with one or more hardware devices corresponding with one of the vehicle subsystems. For example, the user interface 120 may be utilized to provide inputs to hardware associated with the GPS/navigation subsystem 114 for providing instructions related to GPS based functionality provided within the vehicle 102.

In an exemplary embodiment, the voice recognition subsystem 108 may be implemented as a separate hardware device that includes a separate processor, memory, storage, or other hardware. The voice recognition subsystem 108 may include one or more microphones (not shown) located within the vehicle 102 and hardware configured to receive verbal cues (e.g., spoken directives/words) provided by the one or more passengers. As such, the voice recognition subsystem 108 may continuously analyze sensed audio data to locate human speech patterns and then generate a textual or other simple representation of one or more words in the form of a voice input that is provided by the voice recognition subsystem 108 to the command interpreter 104. In some embodiments, the voice recognition subsystem 108 may generate multiple possible words or phrases based on the verbal cues, such as when the voice recognition subsystem 108 may not resolve the spoken word or phrase with 100% certainty. In such embodiments, the voice recognition subsystem 108 may provide possible phrases in the form of voice inputs to the command interpreter 104. In some such embodiments, the voice recognition subsystem 104 may also provide a "confidence value" within the voice inputs for each such possible phrase indicating how confident the voice recognition system 108 is that each possible phrase was the actual phrase spoken.

In an exemplary embodiment, the gesture recognition subsystem 110 may be implemented as a separate hardware device that includes a separate processor, memory, storage, or other hardware. In an exemplary embodiment, the gesture recognition subsystem 110 may include one or more cameras (not shown) located within the vehicle 102 and hardware configured to interpret video or image data sensed by the camera(s) to recognize gestural cues (e.g., pointing at a building in the surrounding environment of the vehicle 102) provided by one or more passengers within the vehicle 102. In one embodiment, the gesture recognition subsystem 110 may include one or more wearable gesture tracking devices (not shown) that are worn by a driver or one or more passengers that can sense gestural cues. The wearable gesture tracking devices may include wearable rings, watches, and/or eye glasses that include a processor that controls one or more gesture tracking sensors capable of tracking and determining gestural cues provided by the person wearing the wearable gesture tracking devices. The gesture recognition subsystem 110 may also utilize virtually any method to perform such gesture recognition in order to determine gesture cues. In an exemplary embodiment, the gesture recognition subsystem 110, processes the determined gestural cues into a gesture input. The gesture recognition subsystem 110 may utilize virtually any method translate the gestural cues into the gesture input.

In an exemplary embodiment, the gesture recognition subsystem 110 may also be connected to a gaze detection subsystem 122 that includes one or more cameras located within the vehicle 102 and hardware configured to interpret video or image data sensed by the camera(s) to detect a driver's and/or one or more passenger's eye positions within the vehicle 102 in order to determine the driver and/or one or more passenger's gaze inputs based on the passenger's gaze cues (to determine where the driver and/or passenger(s) is looking). In an exemplary embodiment, the gaze detection subsystem 122 translates the gaze cues into gaze inputs that are provided to the gesture recognition subsystem 110. In an alternate embodiment, the gaze detection subsystem 122 may be directly connected to the command interpreter 104 and may directly communicate the gaze inputs to the command interpreter 104 independent from the gesture recognition subsystem 110. The gaze detection subsystem 112 may utilize virtually any method to perform such gaze detection.

In an exemplary embodiment, upon identifying a gesture and interpreting data provided by the gaze detection subsystem 122, the gesture recognition subsystem 110 correlates the gaze inputs with the gesture inputs into visual directive data that include determined directives by the driver and/or one or more passengers with respect to the surrounding environment of the vehicle 102. The gesture recognition subsystem 110 sends the visual directive data to the command interpreter 104. In one embodiment, the gesture recognition subsystem 110 may provide the visual directive data that includes a textual or other simple indication of the correlation of gesture inputs and gaze inputs based off of the reception (by the gesture recognition subsystem 110 and the gaze detection subsystem 122) of simultaneous gestural cues and gaze cues that are provided by a passenger. For example, the gestural cues and gaze cues may include "pointing left" and "looking towards the left side of the vehicle 102" or "swiping right" and "looking towards the right side of the vehicle 102" that may be correlated into visual directive data. As another example, the visual directive data provided by the gesture recognition subsystem 110 may include raw data that is descriptive of the gesture cues and gaze cues which is to be further interpreted by the command interpreter 104. In this example, the gesture recognition subsystem 110 may provide one or more vectors indicating a position or motion of a passenger's hand, an indication of whether the passenger's hand is open or closed, or a vector indicating a direction in which a passenger's finger points. The visual directive data may also include confidence values that correspond to multiple possible gestures/gazes.

In an exemplary embodiment, the command interpreter 104 may be included as a separate hardware device. The command interpreter 104 may include at least one processor (not shown) that may be any hardware device capable of executing instructions stored within a memory/storage (not shown). As such, the processor of the command interpreter 104 may include a microprocessor, field programmable gate array (FPGA), application-specific integrated circuit (ASIC), or other similar devices. The memory/storage of the command interpreter 104 may include various memories such as, for example L1, L2, or L3 cache or system memory. As such, the memory may include static random access memory (SRAM), dynamic RAM (DRAM), flash memory, read only memory (ROM), or other similar memory devices. In an alternate embodiment, the command interpreter 104 and the HUD system 112 may be co-resident with respect to each other by utilizing the same processor, but the voice recognition subsystem 108 and the gesture recognition subsystem 110 may be external subsystems to the command interpreter 104. In an additional embodiment, the command interpreter 104, the voice recognition subsystem 108 and the gesture recognition subsystem 110 may be co-resident subsystems with respect to each other.

In an exemplary embodiment, the command interpreter 104 determines directives based on the voice inputs and/or the visual directive data provided by the voice recognition subsystem 108 and the gesture recognition subsystem 110. The command interpreter 104 may also receive inputs from subsystems that receive information other than or in addition to user inputs in order for the command interpreter 104 to associate the directives of the driver and/or one or more passengers with the surrounding environment of the vehicle 102. The system 100 may include the GPS/navigation subsystem 114 that provides GPS navigation routing capabilities to the driver/user within the vehicle 102. The GPS/navigation subsystem 114 may include a hardware device for receiving transmissions from GPS satellites for use in determining locational coordinates of the vehicle 102 with respect to objects located in the surrounding environment of the vehicle 102. For example, using such transmissions and current methods, the GPS/navigation subsystem 114 may be able to calculate the locational coordinates of the vehicle 102 to a value that is accurate to within about ten centimeters of the true position of the vehicle 102. As will be described in more detail below, the GPS/navigation subsystem 114 may provide the current GPS location coordinates of the vehicle 102 and surrounding environment information to the command interpreter 104.

In some embodiments, the GPS/navigation subsystem 114 may include a user interface 120 that receives inputs from the driver and/or passenger(s) through the input terminal 106. In some embodiments, the GPS/navigation subsystem 114 may receive voice inputs directly from the voice recognition subsystem 108. In one embodiment, the GPS/navigation subsystem 114 may also provide this information directly to the HUD system 112 to present navigational guidance to the driver of the vehicle 102.

In an exemplary embodiment, the GPS/navigation subsystem 114 may be connected to the maps/landmarks database 118 that supplies the GPS/navigation subsystem 114 with road network data, destination data, landmark data, points of interest data, street view data, political boundary data, etc. For example, the maps/landmarks database 118 may be accessed by the GPS/navigation subsystem 114 to provide destination data in order to provide a navigational route to a specific point of interest based on input received by the input terminal 106, voice recognition subsystem 108, and/or the gesture recognition subsystem 110.

The system 100 also includes an environment sensing and modeling subsystem 116 that determines characteristics of the objects in the surrounding environment of the vehicle 102. In one embodiment, the environment sensing and modeling subsystem 116 includes one or more environment sensors (not shown) that include external cameras (not shown) that are mounted to the vehicle 102 with associated hardware configured to analyze image or video data received therefrom to identify objects such as, streets, intersections, landmarks, road and lanes edges, buildings, and other objects in the surrounding area of the vehicle 102. In one embodiment, the environment sensors of the environment sensing and modeling subsystem 116 may also include infrared sensors (not shown) and ultrasonic sensors (not shown). Various alternate or additional hardware devices will be apparent for inclusion as environment sensors, for example, radar sensors.

The environment sensing and modeling subsystem 116 may utilize the environment sensors to gather characteristics about such sensed objects such as, for example, object location, object height, object color, object name, object category, object signage (e.g., height, color, name, of a specific building) and virtually any other information that may be used to describe the surrounding environment. In an alternate embodiment, the environment sensing and modeling subsystem 116 may directly communicate with external objects to obtain such information. For example, the environment sensing and modeling subsystem 116 may download information from an externally hosted web based database or access an externally hosted internet search engine to obtain information (e.g., category, name, description, etc.) of a specific landmark. In some embodiments, the environment sensing and modeling subsystem 270 uses the sensed information to generate a model of the surrounding environment. For example, the environment sensing and modeling subsystem 116 may create data objects representing each sensed object and may store information about each object. Such data objects may be nested within a larger "environment" data object that provides environment wide functionality such as locating all non-moving objects in the environment or locating all of objects exhibiting certain characteristics (e.g., "all tall buildings"). Various alternative manners for organizing sensed environment information will be apparent.

The environment sensing and modeling subsystem 116 may also be connected to the maps/landmarks database 118 in order to acquire information that may be paired to the determined characteristics of the objects in the environment surrounding the vehicle 102. In an exemplary embodiment, the environment sensing and modeling subsystem 116 may work in conjunction with the GPS/Navigation subsystem 114 to pair information to be utilized by the command interpreter 104. For example, the command interpreter 104 may be provided determined characteristics of the surrounding environment of the vehicle 102 from the environment sensing and modeling subsystem 116 including the color and height of a building and signage that is placed on the building along with GPS coordinate information from the GPS/Navigation subsystem 114 that is utilized to query the maps/landmarks database 118 to determine details about the building such as the category and name of business that is located within the building.

As noted above, the inputs into the command interpreter 104 may include alternative or additional types of inputs. In addition to receiving current data about user inputs and other information, the command interpreter 104 may also utilize historical information related to any of these inputs. For example, in various embodiments, a historical data subsystem (not shown) may keep a log of the inputs received from one or more of the other subsystems and make such information available to the command interpreter 104 at a later time. In other embodiments, the command interpreter 104 itself may implement such functionality. Further, in some embodiments, one or more of the subsystems may maintain historical data themselves to be provided to the command interpreter 104. For example, the voice recognition subsystem 104 may make voice inputs available over a specific period of time (e.g. last 10 seconds, last 2 hours, or an indefinite period of time) that are available for use by the command interpreter 104 to determine directives.

Using multimodal processing, the inputs into the command interpreter 104 are indefinitely extensible and may even be incorporated into the system 100 in a seamless plug-and-play fashion. For example, additional inputs such as a mobile device or tablet interface may be incorporated into the system 100 for interpretation by the command interpreter 104. As will be described in more detail below, the command interpreter 104 generates augmented reality graphical elements based on directives that are determined by the correlation of voice inputs (provided by the voice recognition subsystem 108) and visual directives (provided by the gesture recognition subsystem 110) that are provided based on the verbal cues, gestural cues, and gaze cues with respect to the surrounding environment of the vehicle 102. The command interpreter 104 associates the determined directives with the surrounding environment of the vehicle 102 (based on data provided by the GPS/Navigation subsystem 114 and the environment sending and modeling subsystem 116) and generates augmented reality graphical elements. The command interpreter 104 sends instructions to the HUD system 112 to display the augmented reality graphical elements.

The instructions to the HUD system 112 may be communicated according to virtually any method for inter-system communication. For example, the command interpreter 104 may generate an instruction message having a format known to be understood by the HUD system 112. As another example, the command interpreter 120 may call an exposed function of the HUD system 112 known to be associated with the instruction. Such function call may be accompanied by one or more parameters.

Figure 2:
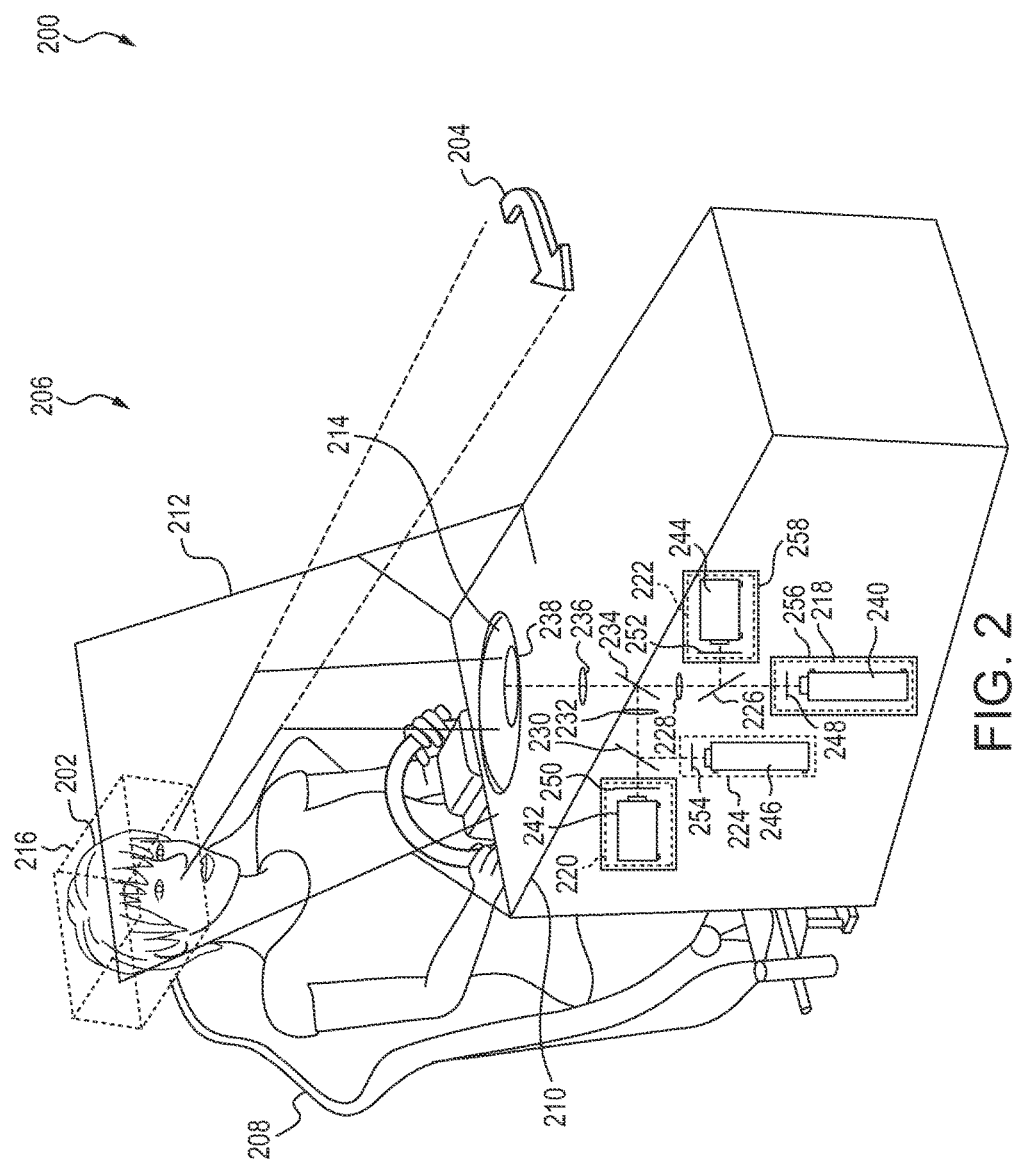
FIG. 2 is an exemplary schematic illustration of a vehicle in which a heads up display system is provided according to an aspect of the present application.

FIG. 2 is a schematic illustration of a vehicle 206 in which a heads up display system 200 is provided. The heads up display system (HUD system) 200 is provided within a vehicle 206 to improve driver safety and convenience. The HUD system includes a volumetric heads up display device (HUD device) 214 that may be housed in a dashboard enclosure 210. The dashboard enclosure 210 defines a space in which the HUD system 200 is housed. Furthermore, the dashboard enclosure 200 includes an aperture 238 from which the HUD device 214 projects graphic elements including augmented reality graphic elements 204 towards the windshield 212. The HUD system 200 also includes a controller (not shown), that may be operably connected to a vehicle control system (not shown) as discussed in more detail below.

In an exemplary embodiment, the HUD system 200 may present the augmented reality graphic elements 204 which augment a physical environment surrounding the vehicle with real-time information that corresponds to one or more passenger directives. By displaying the information in the driver's view, the driver 202 does not need to look away from the windshield toward a passenger (not shown) giving directives (i.e., passenger gestural and verbal cues) while driving to understand the passenger's intended verbal and gestural cues.

In an exemplary embodiment, the HUD system 200 may present the augmented reality graphical elements as positioned spatially and contextually with the surrounding environment of the vehicle 206. Therefore, the HUD system 200 allows the rendering of contact-analog augmented reality graphic elements (i.e., three dimensional graphic elements) into the same space as the real environment as seen by the driver 202 through the windshield 212 of the vehicle 206, rather than being shown as if the augmented reality graphic elements are on a (two-dimensional) display screen located on the windshield 212 of the vehicle 106.

As will be described in more detail below, in an exemplary embodiment, the command interpreter 104 interprets driver and/or passenger(s) words and/or gestures/gazes received as data from the voice recognition subsystem 108 and gesture recognition subsystem 110 into spatio-temporal meanings. The command interpreter may utilize the HUD device 214 to provide augmented reality visual directions, landmarks, and other virtual reality objects augmented based on the spatio-tempral meanings to be shown in accordance with the driver's depth perception as the driver 202 is looking at the real world environment as seen through the windshield 212.

In one embodiment, HUD system 200 may additionally present information typically displayed in the vehicle's center dashboard enclosure 210, such as information related to the vehicle's speed, fuel level, engine temperature, etc. Additionally, the HUD system 200 may also present map information and communication events (e.g., navigation instructions, warnings and alerts, etc.) to the driver 202. The HUD system 200 may present the information to the driver 202 in a manner similar to that employed by the vehicle dashboard, such as by displaying gauges and text boxes which appear as graphic elements on the windshield 212 of the vehicle 206.

The configuration of the vehicle 206, particularly with respect to the relative positioning of a driver seat 208, the dashboard enclosure 210, and the windshield 212, may be conventional. Accordingly, the driver 202 may be positionally constrained to a seating position on the driver seat 208 within the vehicle 206. In view of this positional constraint, the HUD system 200 may be designed using an assumption that the driver's view originates from an eye box 216 within the vehicle 206. The eye box 216 may be considered to include a region of an interior of the vehicle 206 where the driver's eyes are situated while the driver 202 is seated in the driver seat 208.

In one embodiment, the eye box 216 may be sized to encompass all or substantially all possible head positions of the driver 202 regardless of a position and posture of the driver seat 108. In an alternate embodiment, the HUD system 200 may be configured to detect the position and posture of the driver seat 208, and/or the eye position and gaze of the driver 202 (as provided by the gaze detection subsystem) to adjust a position and size of the eye box 216 based thereon. As a further alternative, the HUD system 200 may be designed assuming the eye box 216 has a fixed size and is in a fixed position. For example, the eye box may have the following dimensions: 20 cm×10 cm×10 cm. In any event, the HUD system 200 is configured to present the augmented reality graphic elements 204 to the driver 202 when the driver's eyes are within the eye box 116 and the driver 202 is facing/looking in a forward direction through the windshield 112 of the vehicle 106.

Graphic or environmental elements viewed by the driver 202 through the windshield 212 while the driver's 202 eyes are in the eye box 216 and the driver 202 is facing/looking in the forward direction through the windshield 212 may be considered to be in view of the driver 202. As used herein, the view of the driver 202 of the vehicle 206 while the driver 208 views an environment through the windshield 212 of the vehicle 206 may include an area viewed through the windshield 212, excluding dashboard displays located within the vehicle 206. In other words, the HUD device 214 presents the graphic elements such that the driver 202 may view the augmented reality graphic elements without looking away from the road.

Specifically, the HUD device 214 of the HUD system 200 may include projector units 240, 242, 244, 246 that include projectors 218, 220, 222, 224 that project an output to beam splitters 226, 234, 236. The projector units 240, 242, 244, 246 include a respective diffuser screens 248, 250, 252, 254 rigidly fixed at a set distance from each of the projector units 240, 242, 244, 246 and arranged relative to the projector units such that light emitted from the projector units 240, 242, 244, 246 passes through each respective diffuser screen 248, 250, 252, 254. The projector units 240, 242, 244, 246 are each light-emitting units which project the augmented reality graphic elements 204 that pass through the associated diffuser screen. The diffuser screens 248, 250, 252, 254 serve luminous image source (or object) for the rest of the optical system of the HUD device 214, and ensure that much of the light leaving the diffuser screens 248, 250, 252, 254 spreads out so that it will eventually fill out the eye box 216 so that brightness of the augmented reality graphic elements 204 stays constant while the driver's head moves within the eye box 216. Accordingly, use of the diffuser screens 248, 250, 252, 254 substantially prevents different parts of the image or graphic element(s) from being visible from different points within the eye box 216, and thereby substantially prevents the occurrence of different visual behavior with slight head movement.

The projectors 218, 220 may be mounted on respective actuators 256, 258 that allow the projectors 218, 220 to project the augmented reality graphic elements 204 on dynamic or movable focal planes. The projectors 222, 224 are fixedly arranged in the HUD device 214, and therefore project graphic elements on static focal planes. The focal planes may be, for example, frontal dynamic focal planes and/or ground-parallel focal planes as described in the parent applications of the present application. Using the projectors 218, 220, 222, 224, the HUD device 202 may render augmented reality graphic elements 204 in the four distinct focal planes in order to present the augmented reality graphic elements 204 spatially and contextually with the surrounding environment of the vehicle 206 when the driver's eyes are in the eye box 216 while the driver is looking in the forward direction through the windshield 212.

Figure 3:
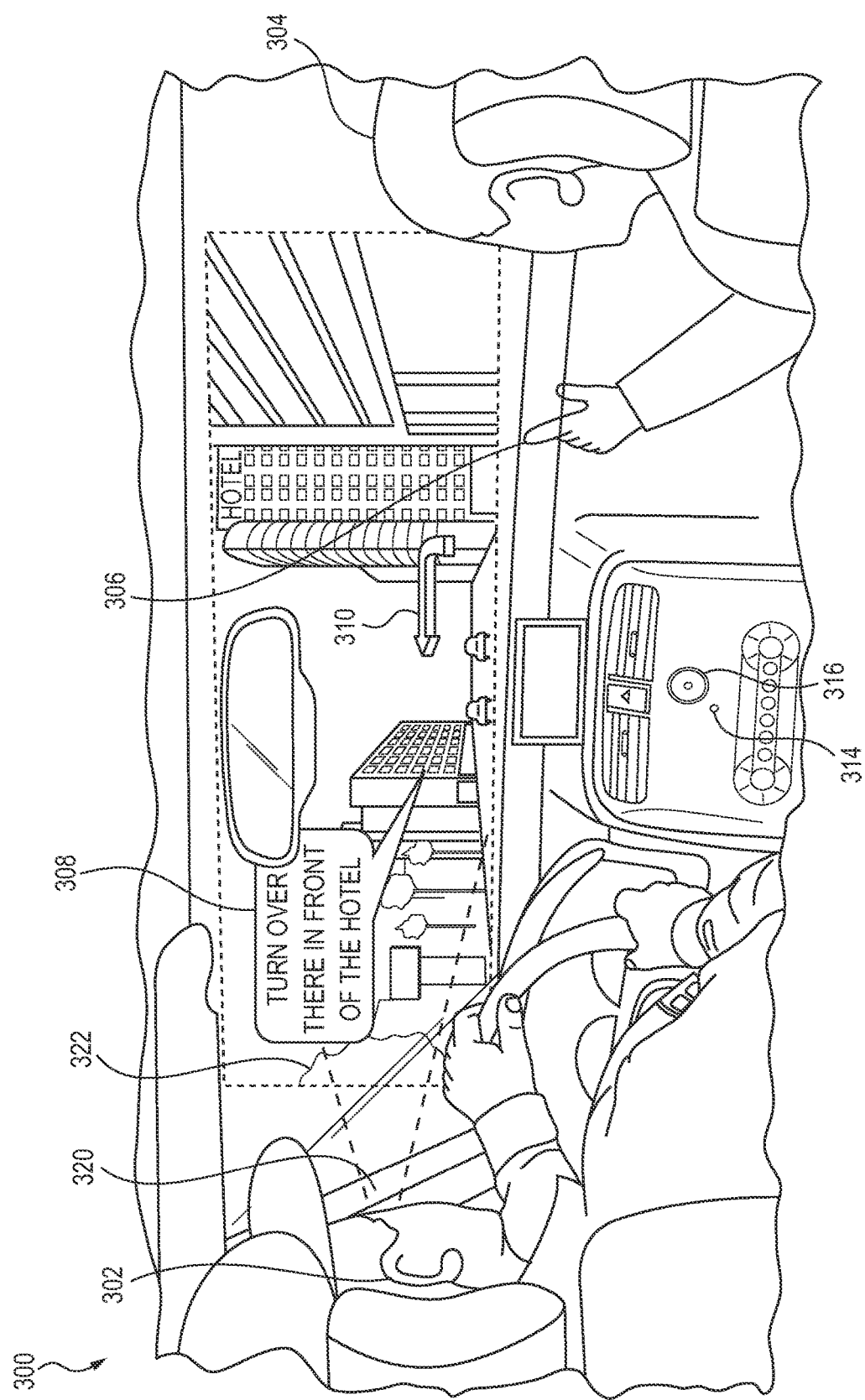
FIG. 3 is an illustration of an instruction assisted direction system providing augmented reality graphical elements through a heads up display device based on a passenger's verbal and gestural cues according to an aspect of the present application.

FIG. 3 is an illustration of an instruction assisted direction system 300 from the operating environment of FIGS. 1 and 2 providing augmented reality graphical elements 308, 310 to a driver 302 on the windshield of a vehicle 320 through a heads up display device 322 based on a passenger's verbal and gestural 306 cues according to an exemplary embodiment. A passenger 304 seated in the front passenger seat of the vehicle 320 or other passengers (not shown) seated in the rear seats of the vehicle 320 may communicate verbal cues to the driver 302 that may include directions, directive commands, and/or statements regarding the environment surrounding the vehicle 320 in order to direct the driver 302 to drive the vehicle 320 in a specific manner. The passengers verbal cues may be received through one or more microphones 314 located within the vehicle 320. The passenger 304 or other passengers may also provide gestural cues that are directed toward the driver 302 that may include pointing motions, swiping motions, waving motions, and other directive motions regarding the environment surrounding the vehicle 320 in order to direct the driver 302 to drive the vehicle 320 in a specific manner. The passenger 304 may also provide gaze cues that correspond to the gesture cues based on the eye movement of the passenger.

In one embodiment, the passenger's gestural cues and gaze cues may be received through one or more cameras 316 located within the vehicle 320. The one or more microphones 314 and cameras 316 may be located throughout the vehicle 320 and may be selectively activated based on the detection of a verbal and/or gestural cue from a driver or passenger(s) seated in a particular seat. Therefore, the one or more cameras may be activated to capture gaze cues after the detection of a verbal and/or gestural cue. For example, in one embodiment, the microphones 314 and cameras 316 may be selectively activated in a specific portion of the vehicle 320 to receive verbal and gestural cues based on activation sensors sent by respective seat sensors located within the vehicle seats. In an alternate embodiment, the passenger's gesture inputs may be received through the one or more wearable gesture tracking devices worn by the passenger. The one or more wearable gesture tracking devices may be selectively activated based on the activation of the one or more gesture tracking sensors based on the passenger's movements. In one embodiment, cameras 316 and the wearable gesture tracking devices may both be utilized to provide the gesture inputs and gaze inputs.

In an exemplary embodiment, the passenger 304 may attempt to direct or assist the driver 302 towards a specific location/destination/direction using verbal and gestural cues 306 and the microphones 314, cameras 316, and/or wearable gesture tracking devices that capture the passenger's 304 verbal, gaze, and gestural cues 306 may provide real time audio, visual data, and/or gesture tracking data to the voice recognition subsystem, gaze detection subsystem, and gesture recognition subsystem.

With reference back to FIG. 1, in an exemplary embodiment, the gaze detection subsystem 122 provides gaze detection data to the gesture recognition subsystem 110. The voice recognition subsystem 108 and gesture recognition subsystem 110 analyze and interpret the passenger's cues and send voice inputs to the command interpreter 104. The command interpreter 104 also receives inputs from the GPS/Navigation subsystem 114 and environment sensing and modeling subsystem 116. For example, the GPS/Navigation subsystem 114 may provide real time details regarding the GPS coordinates of the vehicle 102 in addition to data that is queried and retrieved from the maps/landmarks database 118. Additionally, the environmental sensing and modeling subsystem 116 may provide environmental data regarding the surrounding environment of the vehicle 102 that include details related to the roadway, buildings, and other objects that are present in the vicinity of the vehicle 102 in addition to data that is queried and retrieved from the maps/landmarks database 118.

The command interpreter 104 may utilize instruction metadata to determine how to interact with the subsystems 108, 110, 114, 116, 122 in the instruction assisted direction system 100. For example, the instruction metadata may be a list of instructions understood by each subsystem 108, 110, 114, 116, 122 to which the command interpreter 104 will receive data and/or transmit interpreted instructions. The use of such metadata may render the command interpreter 104 extensible on the output side in that base support for additional subsystems may be added (in some embodiments) simply by providing instruction metadata to the command interpreter 104. In an exemplary embodiment, the command interpreter 104 translates the various inputs received from the voice recognition subsystem 108, the gesture recognition subsystem 110, the GPS/navigation subsystem 114, and the environment sensing and modeling subsystem 116 into system instructions for the HUD system 112.

In an exemplary embodiment, as will be described in more detail below, the memory/storage of the command interpreter 104 may include GPS navigation data provided by the GPS/Navigation subsystem 114, environment modeling data provided by the environment sensing and modeling subsystem 116, voice input data provided by the voice recognition subsystem 108, visual directive data provided by the gesture recognition subsystem 110, and system instructions, for performing the various functions described as being associated with each of these respective subsystems. The memory/storage of the command interpreter 104 may also store command interpretation instructions that are associated with the data provided by the subsystems 108, 110, 114, 116. The instructions may be implemented by the processor (discussed above) of the command interpreter 104. These instructions may be implemented in virtually any manner to perform the functions described herein.

In some embodiments, the command interpretation instructions utilize an instruction metadata to assist in generating system instructions that will be properly interpreted by the HUD system 112. Additionally, in various embodiments that utilize machine-learning to drive the processing performed by the command interpretation instructions, the memory/storage (discussed above) may store a database of learned rules or other data structures for persisting a machine learning state.

With reference back to FIG. 3, as stated above, upon receiving verbal inputs and visual directive data based on the verbal and gestural cues provided by the passenger, the command interpreter 104 may determine directives based on the verbal inputs and directive data. The command interpreter 104 may then generate augmented reality graphical elements based on the directives and translate generated augmented reality graphical elements into command instructions that are sent to the HUD system 112. Upon receipt and analysis of the command instructions, the HUD device 322 may project the augmented reality graphical elements 308, 310 to be shown on the windshield of the vehicle 320. As described above, the driver's HUD system 112 utilizes various projectors to render the augmented reality graphic elements 308, 310 in four distinct focal planes in the environment according to the driver's 302 depth perception when the driver's 302 eyes are in the eye box (as described above). Therefore, the augmented reality graphic elements 308, 310 appear spatially and contextually (e.g., as overlaid upon objects) within a three-dimensional surrounding environment as seen by the driver 302 through the windshield of the vehicle 320.

In the illustrative example shown in FIG. 3, the passenger 304 may instruct the driver to "turn over there in front of the hotel" and the passenger 304 may additionally provide the gesture 306 by pointing in the direction and gaze (not shown) towards the street where he or she intends the driver 302 to turn. Upon the microphones 314, cameras 316, and/or wearable gesture tracking devices capturing the passenger's verbal, gaze, and gestural cues, corresponding inputs are sent to the command interpreter from the voice recognition subsystem and the gesture recognition subsystem. In addition the GPS/navigation subsystem and the environment sensing subsystem provide data relating to the surrounding environment of the vehicle in real time (i.e., at the same time or shortly thereafter the passenger provides the verbal and/or gestural cues). This data may include GPS location coordinate data of the vehicle, descriptive data related to landmarks, points of interest, streets, cross streets, intersections, and other objects that are surrounding the vehicle 320.

The command interpreter interprets the data and instructions provided by the subsystems and generates augmented reality graphical elements based on the directives corresponding the passenger's verbal and gestural cues. The command interpreter provides command instructions to the HUD system 300 to project the (generated) augmented reality graphic elements 308, 310. As shown, in an exemplary embodiment, the HUD system 300 projects augmented reality graphic element 308 that corresponds to the directive that the passenger 304 spoke to the driver 302. The HUD system 300 also may present augmented reality graphic element 310 as a turn arrow graphic that navigates the driver 302 to turn in front of the hotel 312 as directed by the passenger's gestures 306 and eye gaze. In one embodiment, the HUD system 300 may also highlight the point of interest (e.g., the intended street to turn on, the hotel) that the passenger 304 is referring to.

In one embodiment, the HUD system 300 may present additional information that relates to the point of interest that the passenger 304 is referring to. For example, the passenger 304 may ask the driver 302 "what is the name of the hotel over there?" while pointing to the hotel 312. Based on the receipt of the corresponding voice input from the voice recognition subsystem of the passenger's question to the driver 302, the command interpreter may utilize the GPS/navigation subsystem in conjunction with the environment sensing and modeling subsystem to query the maps/landmarks database or may utilize a communication device (not shown) to query an external database and/or an internet search engine to retrieve information about the hotel based on its description (e.g., a specific description of a building and specific streets and street names that are located around the building) provided by the environment sensing and modeling subsystem. Upon analyzing the inputted and retrieved information provided by the subsystems, the command interpreter generates augmented reality elements and provides command instructions to the HUD system in order for the HUD device 322 to present the augmented reality graphic elements above/near the hotel 312 that provide description of the highlighted hotel 312.

In an alternate embodiment, the instruction assisted direction system 300 may also utilize the heads up display system to interpret the driver 302 or passenger's 304 statements that correspond with a command request directly to the system 300 for additional information with regards to a particular point of interest. For example, the passenger 304 may provide a gesture 306 towards a particular restaurant and may command the instruction assisted direction system 300 to identify the restaurant. Based on the receipt and analysis of the passenger's request, the command interpreter 104 may utilize the environment sensing and modeling subsystem along with the GPS/navigation subsystem to provide a query to the maps/landmarks database and/or may utilize the communication device to query an external database and/or an internet search engine to retrieve information about the particular restaurant. Upon analyzing the inputted and retrieved information provided by the subsystems, the command interpreter may provide command instructions to the HUD system in order for the HUD device 322 to present augmented reality graphic elements (not shown) above/near the restaurant that provide a description of the restaurant including the name of the restaurant, ratings, type of cuisine, etc.

In some embodiments, the command interpreter may be utilized by other subsystems to communicate back to the driver 302 and/or passenger(s) 304. For example, during a process wherein the command interpreter 104 issues an instruction, the command interpreter 104 may output a confirmation message to the driver and/or passenger(s). The instruction assisted direction system 300 may also utilize saved customized points of interest data such as a home address in order to provide turn by turn navigation directions to the driver 302 of the vehicle 320. For example, the passenger 304 may state to the driver 302 "lets go home" and upon the driver 302 responding "ok", the command interpreter may ask the driver 302 (verbally through speakers (not shown) or visually through the HUD device 322) if he or she would like directions to the destination. If the driver 302 answers affirmatively, the command interpreter may provide command instructions (based off of generated augmented reality graphic elements) to the HUD system in order for the HUD device 322 to present augmented reality graphic elements in the form of turn arrow graphics 310 that correspond with audio turn by turn directions provided by the GPS/navigation subsystem. Various additional applications and embodiments will be apparent.

Various additional features for incorporation into the command interpreter 104 will be apparent. For example, in some embodiments, the command interpreter 104 may be able to differentiate between a driver and a passenger or between multiple passengers based on, for example, voice identification or location the source of a voice input or gesture. Such information may be used, for example, to accept commands only from a driver or to only analyze input from a single user at a time. In some embodiments, the command interpreter 104 may operate according to a mode where only a driver may issue commands and alternatively according to a mode where passengers may also issue commands. In some embodiments, the command interpreter 104 may ignore specific speech patterns. For example, the command interpreter 104 may recognize some speech and gestures as originating from child passengers and consequently ignore such commands. In another embodiment, the command interpreter 104 may associate different voices with specific vehicle commands (e.g., commands to the GPS/navigation subsystem 114) and ignore any commands that are issued by the passenger(s) that are not permitted to issue such a command.

Figure 4:
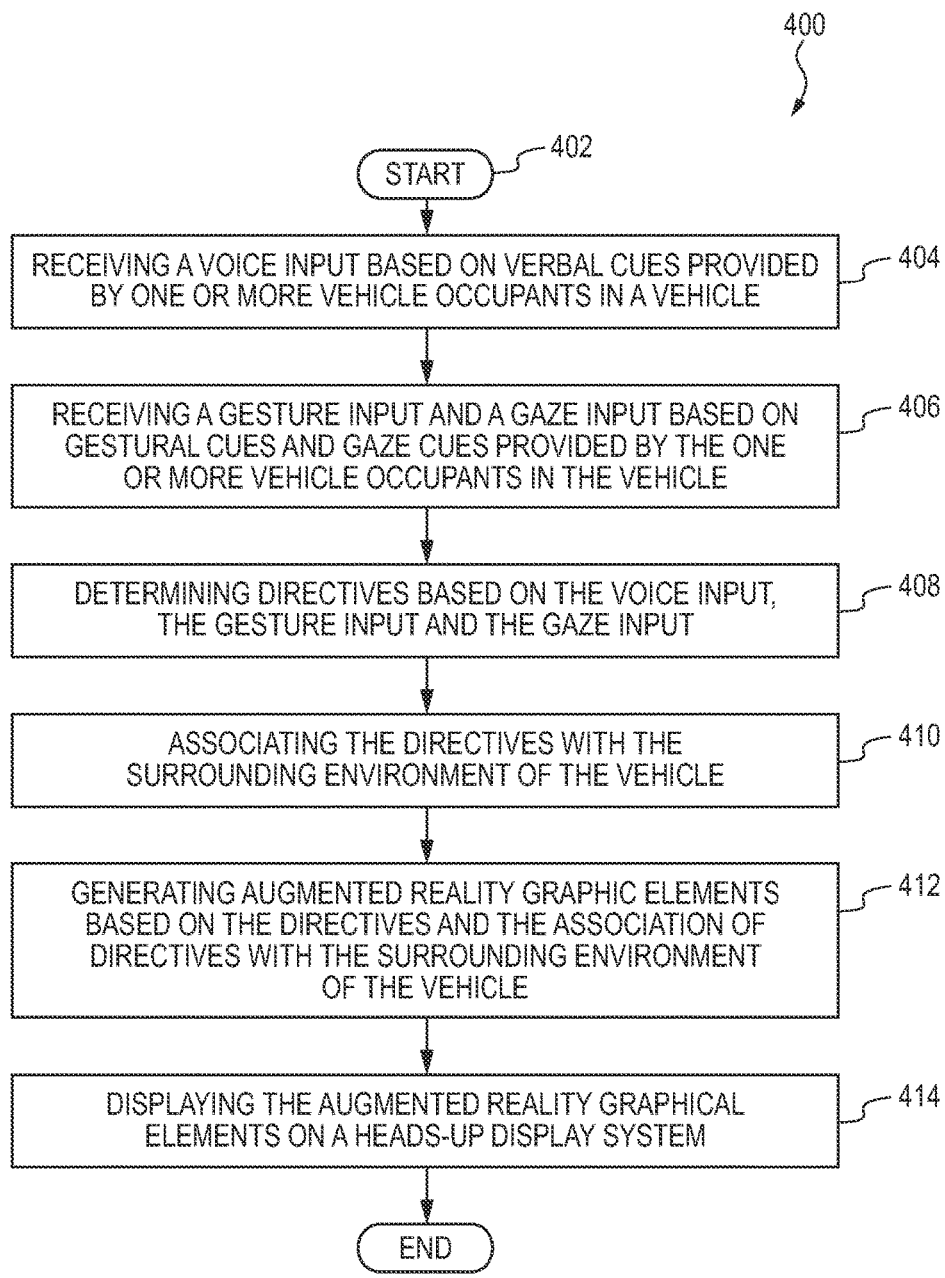
FIG. 4 illustrates an exemplary method of the instruction assisted direction system for providing augmented reality based directions on a heads up display system of a vehicle from the operating environment of FIG. 1 according to an aspect of the present application.

FIG. 4 illustrates an exemplary method 400 of the instruction assisted direction system 100 for providing augmented reality based directions for providing augmented reality based directions on the HUD system 112 of the vehicle 102. The method 400 will be described herein in association with the operating environment of FIG. 1, though this is not required. The exemplary method 400 is an overview of the process utilized by the instruction assisted direction system 100 that will be further explained in more detail below with reference to FIGS. 5 and 6. The illustrated method 400 begins with block 402 and proceeds to block 404 where the method includes receiving a voice input based on verbal cues provided by one or more vehicle occupants in a vehicle 102.

At block 406, the method includes receiving a gesture input and a gaze input based on gestural cues and gaze cues provided by the one or more vehicle occupants in the vehicle 102. At block 408, the method includes determining directives based on the voice input, the gesture input and the gaze input. At block 410, the method includes associating the directives with the surrounding environment of the vehicle 102. At block 412, the method includes generating augmented reality graphical elements based on the directives and the association of directives with the surrounding environment of the vehicle 102. At step 414, the method includes displaying the augmented reality graphical elements on a heads-up display system 112.

Figure 5:
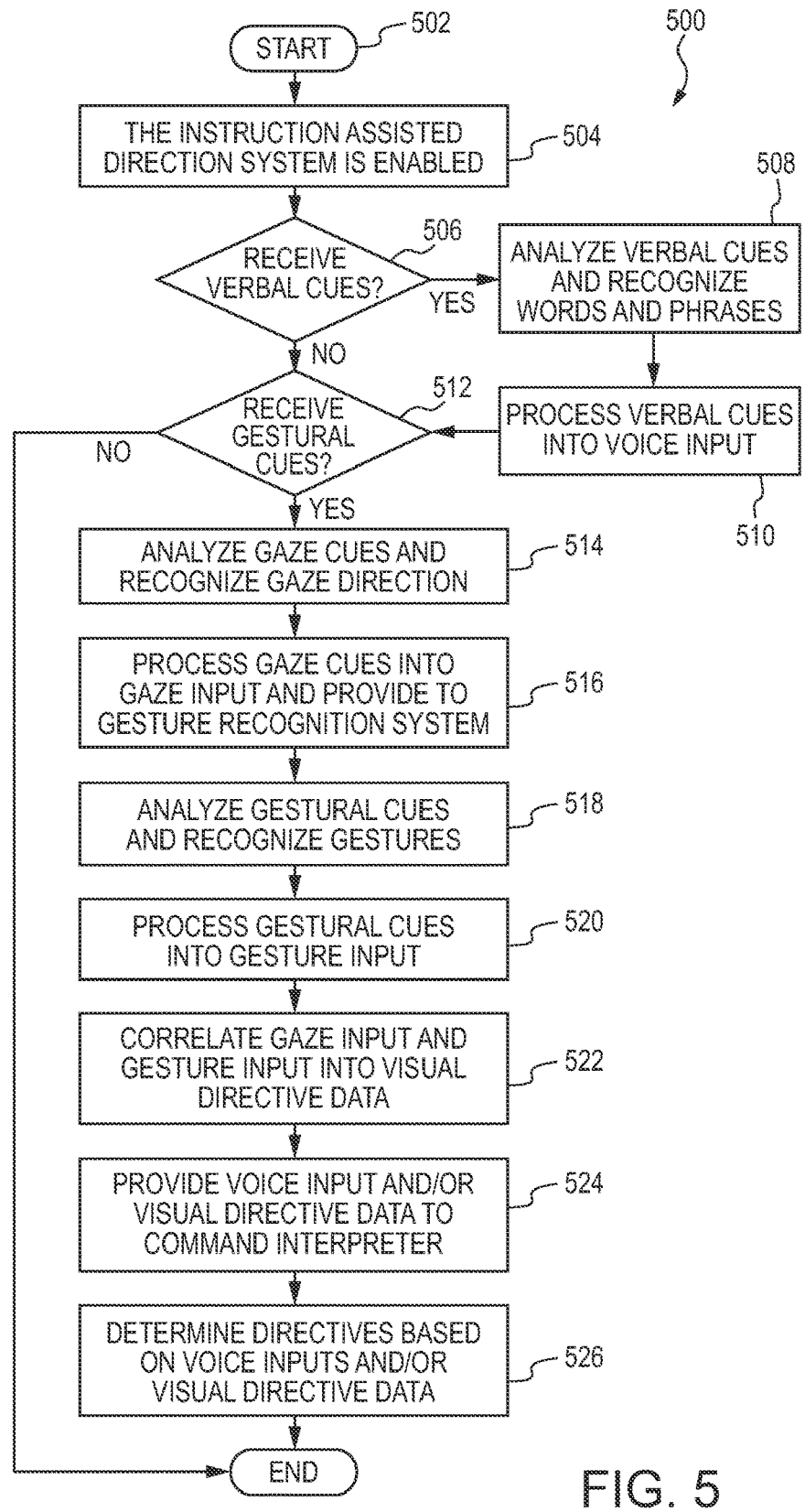
FIG. 5 illustrates an exemplary method of the instruction assisted direction system for determining directives based on verbal inputs, gestural inputs and gaze inputs from the operating environment of FIG. 1 according to an aspect of the present application.

FIG. 5 illustrates an exemplary method 500 of the instruction assisted direction system 100 for determining directives based on verbal inputs, gestural inputs and gaze inputs from the operating environment of FIG. 1. The method 500 will be described herein in association with the operating environment of FIG. 1, though this is not required. The illustrated method 500 begins with block 502 and proceeds to block 504 where the system 100 is enabled. In one embodiment, the system 100 may be selectively enabled by the driver of the vehicle 102 using an input button or toggle switch. In an alternate embodiment, the passenger assisting landmark detection system 100 is enabled by default when the vehicle 102 receives power (i.e., when the vehicle is put into an accessory or vehicle engine is enabled).

In the method of FIG. 5, a specific order of analyzing verbal inputs followed by gaze inputs and gesture inputs is shown, however, it is understood that the method and systems described herein may analyze the voice inputs, gaze inputs, and gesture inputs simultaneously or in any selective order as received. At block 506, it is determined if the system 100 receives verbal cues from one or more occupants of the vehicle 102 (e.g., the driver and/or one or more passengers). In one embodiment, the microphone(s) of the voice recognition subsystem 108 may monitor and pick up sounds within the vehicle 102 inclusive of verbal cues provided by the occupants of the vehicle 102.

If it is determined that verbal cues are received (at block 506), at block 508, the voice recognition subsystem 108 analyzes the verbal cues and recognizes words and phrases. In one embodiment, as the microphone(s) picks up and monitors the audio from the vehicle 102, the voice recognition subsystem 108 determines the portions of real audio captured by the microphone(s) within the vehicle 102 that includes verbal cues provided by the driver and/or passenger (s) and analyzes the respective portion(s) of audio as a voice input in order to recognize spoken words and phrases. In an exemplary embodiment, the voice recognition subsystem 108 continuously analyzes the voice input data to locate human speech patterns and then generates a textual or other simple representation of one or more words and phrases. In one embodiment, the voice recognition subsystem 108 may utilize the camera(s) to decipher the sound as verbal cues provided by a specific person (driver or passenger) within a specific area of the vehicle 102. The voice recognition subsystem 108 may generate multiple possible words and/or phrases based on the same input, or may assign a confidence value to specific words or phrases within the voice input. At block 510, the voice recognition subsystem 108 processes the verbal cues into a voice input. The voice recognition subsystem 108 may utilize virtually any method to perform voice recognition and translate the verbal cues into the voice input.

If it is determined that the voice input is not received (at block 506), at block 512, it is directly determined if the system 100 receives gestural cues from one or more occupants of the vehicle 102. If it is determined (at block 512) that the system 100 receives gestural cues from one or more occupants of the vehicle 102, the method progresses to block 514, wherein the gaze detection subsystem 122 continuously analyzes the gaze cues to recognize the driver and passenger (s) gaze direction. In an exemplary embodiment, the camera (s) included as part of the gaze detection subsystem 122 and/or the gesture recognition subsystem 110 may monitor and continuously capture the driver and the passenger(s) eye movements within the vehicle 102. In an exemplary embodiment, the gaze detection subsystem 122 continuously analyzes the gaze cues to recognize the driver and passenger(s) gaze direction. Specifically, the gaze detection subsystem 122 detects the location of the driver and/or passenger's eyes from the image sent by the camera(s) and specifically evaluates specific areas of the eyes (e.g., iris, pupil, corners of the eye, etc.). At block 516, the gaze detection subsystem 110 processes the gaze cues into gaze input and provides the gaze input to the gesture recognition subsystem 110. The gaze detection subsystem 122 may utilize virtually any method to perform gaze detection and translate the gaze cues into a gaze input. In one embodiment, the gaze detection subsystem 110 analyzes the gaze direction of the driver or passenger(s) eyes based off of a linear model based on the evaluation of the specific areas of the eyes of the driver and/or passenger(s). In an alternate embodiment, the gaze detection subsystem 122 may provide the gaze input directly to the command interpreter 104, thereby bypassing the gesture recognition subsystem 110.

At block 518, the gesture recognition subsystem 110 analyzes gestural cues and recognizes gestures. In one embodiment, the camera(s) of the gesture recognition subsystem 110 may monitor and capture movements of the driver and/or passenger(s) and provide the image data to the gesture recognition subsystem 110. In an exemplary embodiment, the image data may include images captured from one or more cameras that are only captured when a driver and or passenger's movements are detected based on activation sensors sent by respective passenger seat sensors located within the vehicle seats. For example, the cameras may provide images of a passenger when the passenger is moving in a specific manner (e.g., that is indicative of a gesture). In one embodiment, the image data may include raw image data that includes images captured from one or more cameras that are only captured when a driver and/or passenger is determined to provide verbal cues and simultaneously provide movements that are indicative of providing gestural cues. For example, the cameras may provide images of a passenger that is speaking to the driver and pointing to an object at the same time. In an alternate embodiment, the wearable gesture tracking devices of the gesture recognition subsystem 110 may detect and capture movements of the driver and/or passenger(s) wearing the wearable gesture tracking devices and provide the gesture tracking data based on gestural cues to the gesture recognition subsystem 100. For example, the gesture tracking data may include raw data that includes vectors representing movements detected by the one or more wearable computing devices that are indicative of providing gestural cues.

At block 520, the gesture recognition subsystem 110, processes the gestural cues into a gesture input. The gesture recognition subsystem 110 may utilize virtually any method translate the gestural cues into the gesture input. In one embodiment, the gesture recognition subsystem 110 may provide a textual or other simple indication of the gesture performed such as "pointing left" or "swiping right."

As stated above, in an alternate embodiment, the gesture recognition subsystem 110 may provide one or more vectors indicating a position or motion or direction in which a driver or passenger is pointing and/or swiping. Various additional data forms for representing a human gesture will be apparent. Similar to the voice recognition subsystem 240, the gesture recognition subsystem 250 may report multiple possible gestures and such possible gestures may also be accompanied by associated confidence values. The gesture input may include raw data that includes movements and gestures as captured and associated information (e.g., confidence values, driver or specific passenger that performed the gesture) that are packaged together into the gesture data.

At block 522, the gesture recognition subsystem 110 correlates the gesture input and the gaze input into visual directive data. In one embodiment, the visual directive data includes the gesture input that is correlated to the gaze input to provide synced directive data of a driver and/or passenger (s) that are based on the driver and/or passenger's eye movements and gestures at a given point in time. For example, if the passenger provides a gestural cue by pointing to an object at a given time, the gestural cue is processed into a gesture input. As discussed above, the passenger's gaze towards the object is captured as gaze cue and is processed into a gaze input. Both the gestural input and gaze input are correlated to generate the visual directive data that includes synced data of the gesture input and the gaze input.

At block 524, the voice input and/or visual directive data is provided to the command interpreter 104. At block 526, the command interpreter 104 determines directives based on the voice inputs and/or the visual directive data. In an exemplary embodiment, the command interpreter receives the voice input and/or directive data from the voice recognition subsystem 108 and/or the gesture recognition subsystem 110. As will be discussed in more detail below, the command interpreter 104 utilizes the available input to generating augmented reality graphical elements and to determine one or more appropriate system instructions to issue to the HUD system 112 in order to display the augmented reality graphical elements. For example, the command interpreter 104 may interpret the voice input "turn left before the hotel," and a gesture input that represents a hand gesture to the left, into directives that are associated with the surrounding environment of the vehicle 102, as discussed in more detail with regards to FIG. 6.

Figure 6:
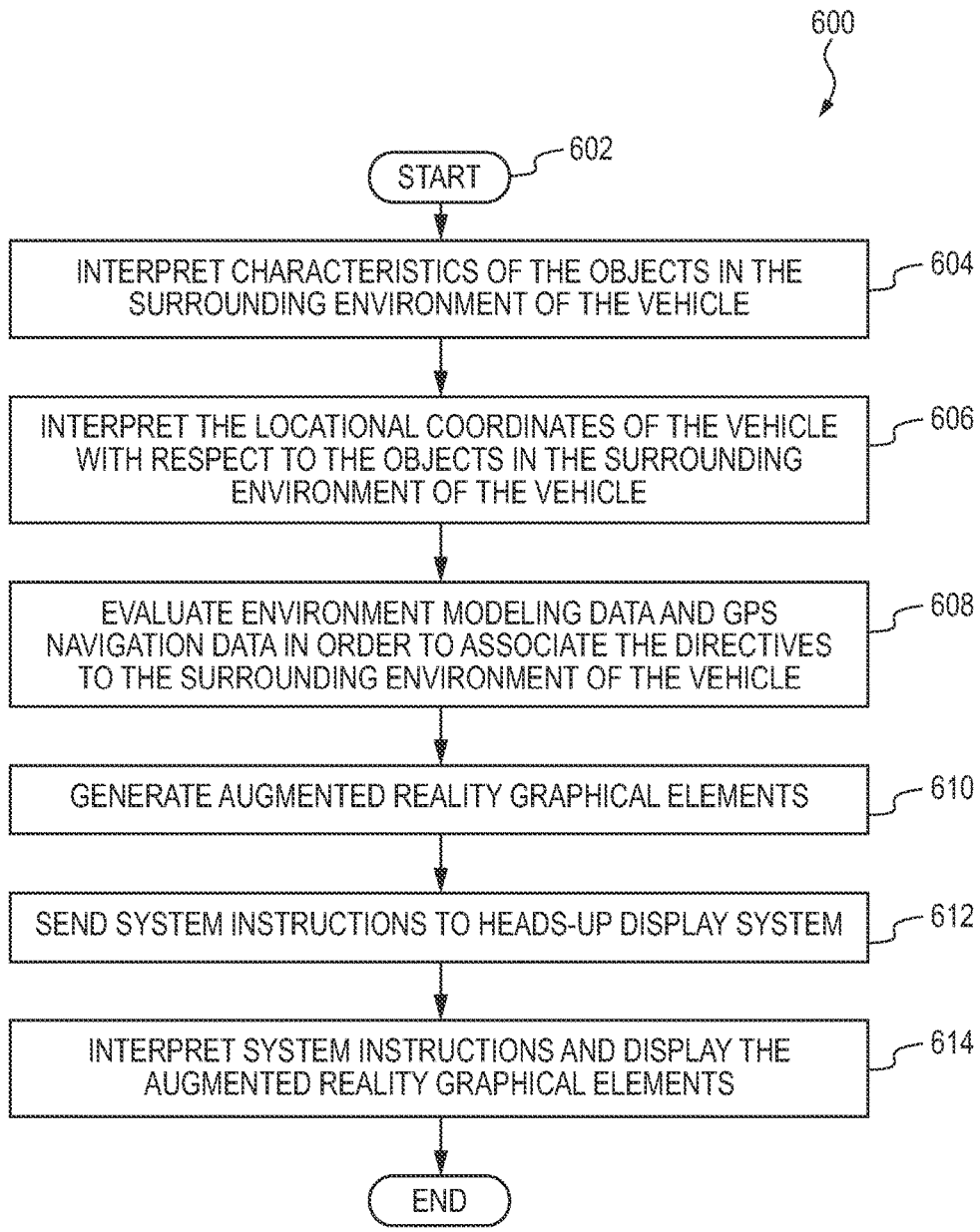
FIG. 6 illustrates an exemplary method of the instruction assisted direction system for associating directives with the surrounding environment of the vehicle and generating augmented reality graphic elements to provide instructions to the driver's heads up display system from the operating environment of FIG. 1 according to an aspect of the present application.

FIG. 6 illustrates an exemplary method 600 of the instruction assisted direction system 100 for associating directives with the surrounding environment of the vehicle and generating augmented reality graphic elements to provide instructions to the driver's heads up display system 112. The method 600 will be described herein in association with the operating environment of FIG. 1, though this is not required. The method 600 begins with block 602 and proceeds to block 604 where the command interpreter 104 interprets characteristics of the objects in the surrounding environment of the vehicle 102 based off of directives determined by the command interpreter 104 (determined at step 526 of FIG. 5).

In an exemplary embodiment, the environment sensing and modeling subsystem 116 utilizes external cameras (not shown) that are mounted to the vehicle 102 with associated hardware configured to analyze image or video data received therefrom to determine characteristics of the objects in the surrounding environment of the vehicle 102. The environment sensing and modeling subsystem 116 translates the determined characteristics of the objects into environment modeling data and provides the environment modeling data to the command interpreter 104. Specifically, upon determining the directive data, the command interpreter 104 may utilize the environment sensing and modeling subsystem 116 to provide the environment modeling data. The command interpreter 104 may analyze the environment modeling data in order to determine objects surrounding the vehicle 102 that are referenced by the driver and/or passenger (e.g., streets, intersections, landmarks, road and lanes edges, buildings, and points of interest).

In an exemplary embodiment, the environment sensing and modeling subsystem 116 may perform a query on the maps/landmarks database 118 to retrieve descriptive information about specific types of object(s) in order to determine characteristics of the objects based on the directives determined by the command interpreter 104. The environment sensing and modeling subsystem 116 may determine buildings and streets as objects, and may query the maps/landmarks database 118 to acquire characteristics about the buildings and streets. For example, the environment sensing and modeling subsystem 116 may determine the characteristics of buildings located on the right side of the vehicle 102, and may provide environmental modeling data to the command interpreter 104 detailing characteristics of the objects as specific point of interest characteristics of the buildings (e.g., hotels, restaurants, etc.).

At block 606, the command interpreter 104 interprets the locational coordinates of the vehicle 102 from the GPS/navigation subsystem 114 based off of directives determined by the command interpreter 104 (determined at step 526 of FIG. 5). In an exemplary embodiment, the GPS/Navigation subsystem 114 utilizes a hardware device for receiving transmissions from GPS satellites in order to determine the locational coordinates of the vehicle 102 with respect to objects in the surrounding environment of the vehicle 102. The GPS/Navigation subsystem 114 translates the locational coordinates of the vehicle with respect to the objects in the surround environment of the vehicle 102 as GPS navigation data and provides the GPS navigation data to the command interpreter 104. In one embodiment, the GPS navigation data includes the vehicle's 102 locational coordinates, locational coordinates of objects, point of interest information, and street mapping information that is utilized by the command interpreter 104 to identify the vehicle's 102 position with respect to objects sensed in the environment (by the environment sensing and modeling subsystem 116).

In an exemplary embodiment, the GPS/Navigation subsystem 114 may perform a query on the maps/landmarks database 118 in order to retrieve descriptive information about specific streets, buildings, and points of interests (e.g., hotels, restaurants, airports, gas stations, etc.) that are referenced within the voice data or directive data that is being analyzed by the command interpreter 104. For example, the GPS/Navigation subsystem 114 may determine that the locational coordinates of the vehicle 102 with respect to upcoming buildings on the right side of the vehicle 102, and may further query the maps/landmarks database 118 to determine streets located around the buildings. Additionally, the GPS/Navigation subsystem 114 may provide GPS/navigation data to the command interpreter 104 detailing the locational coordinates of the vehicle 102 with respect to the upcoming buildings and streets located around the buildings.

In one embodiment, the command interpreter 104 may also utilize the GPS navigation data provided by the GPS/navigation subsystem 114 to provide real time turn by turn directions to a certain referenced object and/or destination. For example, the command interpreter 104 may utilize the GPS/navigation subsystem 114 to generate augmented reality elements in the form of visual turn arrows that are presented by the HUD system 112 as overlaid over streets to provide directions to the driver of the vehicle 102 based on a passenger's verbal or gestural cues.

At block 608, the command interpreter 104 evaluates the characteristics of objects in the surrounding environment of the vehicle 102 and the locational coordinates of the vehicle together in order to associate the directives (that were determined by the command interpreter 104, at step 526 of FIG. 5) to the surrounding environment of the vehicle 102. In one embodiment, the command interpreter 104 evaluates the environmental modeling data in conjunction with the GPS navigation data with respect to specific objects in the surrounding environment of the vehicle 102. For instance, if the command interpreter 104 determines (from the environmental modeling data) that there are numerous buildings in the environment that are located to the right of the vehicle 102, the command interpreter 104 may also determine the locational coordinates of the vehicle 102 with respect to the numerous buildings to determine which building is specifically referred to by the directives based on voice inputs received from the voice recognition subsystem 110 and visual directives received from the gesture recognition subsystem 110. Additionally, data provided by the maps/landmarks database implicit within the environment modeling data and GPS navigation data may further be utilized to specify categories of buildings, names of buildings, and names of streets that appear within the environment in the vehicle's 102 path.

At block 610, the command interpreter 104 generates augmented reality graphical elements based on determined directives associated with the surrounding environment of the vehicle 102. In one embodiment, the command interpreter 104 may utilize multimodal principals and sensor fusion to utilize all available information of many different types to determine one or more appropriate augmented reality graphical elements. This block may be implemented using various artificial intelligence, rules engine, hard coded, or other approaches. For example, a Bayesian network may be used to combine the various different data inputs to generate a combined view of all of the data available and to further indicate the result of fused inputs.

At block 612, the command interpreter 104 sends system instructions to the heads up display system. The system instructions include software based coded commands that instruct the HUD system 112 to augment the real world environment as shown through the vehicle windshield with specific types of augmented reality graphic elements that are overlaid upon real world objects at specific positions. In one embodiment, the command interpreter 104 may perform a function call that passes parameter values to the HUD system 112. In an alternate embodiment, the command interpreter 104 may construct an XML object or other data object identifying command and parameter values to be passed to the HUD system 112 via a known method, for example, inter-process communication via an operating system.

At block 614, the HUD device of the HUD system 112 interprets the system instructions and displays augmented reality graphic elements to the driver of the vehicle 102. The HUD system 112 allows the rendering of the contact-analog augmented reality graphic elements positioned spatially and contextually into the same space as the surrounding real environment of the vehicle 102 as seen by the driver through the windshield of the vehicle 102. As described above, the HUD device may render the augmented reality graphic elements to be presented spatially and contextually in four distinct focal planes in the surrounding environment of the vehicle 102 according to the driver's depth perception when the driver is driving the vehicle 102.

As discussed, various embodiments of instruction assisted direction system 100 may be utilized. Also, numerous components and technologies that have not been discussed herein may be utilized to compute operations associated with the instruction assisted direction system 100. It is to be appreciated that the command interpreter 104 of the instruction assisted direction system 100, may be utilized to provide additional instructions to additional vehicle systems in addition to or in lieu of the HUD system 112. For example, the command interpreter 104 may be utilized to issue instructions to an autonomous control subsystem (not shown) capable of interpreting instructions in order to drive the vehicle 102 in a manner respective to the driver's vocal or gestural cues.

It should be apparent from the foregoing description that various exemplary embodiments of the application may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the application. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for providing augmented reality based directions, comprising:
   receiving a voice input based on verbal cues provided by a passenger in a vehicle;
   receiving a gesture input and a gaze input based on gestural cues and gaze cues provided by the passenger in the vehicle, wherein the gaze input of the passenger includes an object in a surrounding environment and an associated focal plane for the object, wherein the gaze input of the passenger is indicative of where the passenger is looking;
   determining directives based on the voice input, the gesture input and the gaze input;
   associating the directives with the surrounding environment of the vehicle;
   generating augmented reality graphical elements based on the directives and the association of the directives with the surrounding environment of the vehicle; and
   displaying, for a driver of the vehicle, the augmented reality graphical elements on a heads-up display system of the vehicle using an actuator to move a projector based on a location of the object in the surrounding environment to project the augmented reality graphical elements at the focal plane associated with the object, wherein the augmented reality graphical elements are displayed at the focal plane associated with the object from the gaze input of the passenger where the passenger is looking.

2. The method of claim 1, comprising generating visual directive data by correlating the gesture input and the gaze input.

3. The method of claim 2, wherein determining directives include correlating the voice input with the visual directive data with respect to objects in the surrounding environment of the vehicle.

4. The method of claim 3, wherein associating the directives with the surrounding environment of the vehicle comprises determining locational coordinates of the vehicle with respect to objects in the surrounding environment of the vehicle.

5. The method of claim 4, wherein associating the directives with the surrounding environment of the vehicle comprises determining characteristics of the objects in the surrounding environment of the vehicle.

6. The method of claim 5, wherein generating the augmented reality graphical elements comprises evaluating at least one of a plurality of rules based on at least one of the directives, the location coordinates of the vehicle with respect to objects in the surrounding environment of the vehicle, and the characteristics of the objects in the surrounding environment of the vehicle.

7. The method of claim 6, wherein displaying the augmented reality graphical elements on the heads-up display system of the vehicle comprises positioning the augmented reality graphical elements spatially and contextually with the surrounding environment of the vehicle as shown through the heads-up display.

8. A system for providing augmented reality based directions, comprising,
a voice recognition subsystem that provides a voice input based on verbal cues provided by a passenger in a vehicle;
a gesture recognition subsystem that provides a gesture input and a gaze input based on gestural cues and gaze cues provided by the passenger in the vehicle, wherein the gaze input of the passenger includes an object in a surrounding environment and an associated focal plane for the object, wherein the gaze input of the passenger is indicative of where the passenger is looking;
a command interpreter, implemented via a processor, that determines directives based on the voice input provided by the voice recognition subsystem, and the gesture input and the gaze input provided by the gesture recognition subsystem and associates the directives with the surrounding environment of the vehicle,
wherein the command interpreter generates augmented reality graphical elements based on the directives and the association of the directives with the surrounding environment of the vehicle, and
a heads up display system displays the augmented reality graphical elements generated by the command interpreter for a driver of the vehicle using an actuator to move a projector based on a location of the object in the surrounding environment to project the augmented reality graphical elements at the focal plane associated with the object,
wherein the augmented reality graphical elements are displayed, for the driver of the vehicle, at the focal plane associated with the object from the gaze input of the passenger where the passenger is looking.

9. The system of claim 8, comprising a gaze detection subsystem providing the gaze input to the gesture recognition subsystem, wherein the gesture recognition subsystem generates visual directive data by correlating the gesture input and the gaze input.

10. The system of claim 8, wherein the command interpreter determines directives by correlating the voice input provided by the voice recognition subsystem with the visual directive data provided by the gesture recognition subsystem with respect to objects in the surrounding environment of the vehicle.

11. The system of claim 8, comprising a GPS/Navigation subsystem that determines locational coordinates of the vehicle with respect to objects surrounding the environment of the vehicle.

12. The system of claim 8, comprising an environment sensing and modeling subsystem that determines characteristics of the objects in the surrounding environment of the vehicle.

13. The system of claim 12, wherein the command interpreter generates augmented reality graphical elements based on an evaluation of at least one of a plurality of rules based on at least one of the directives, the location coordinates of the vehicle with respect to objects in the surrounding environment of the vehicle provided by a GPS/Navigation subsystem, and the characteristics of the objects in the surrounding environment of the vehicle provided by the environment sensing and modeling subsystem.

14. The system of claim 13, wherein the heads up display system positions the augmented reality graphical elements spatially and contextually with the surrounding environment of the vehicle.

15. A non-transitory computer readable-storage medium storing instructions that when executed by a processor perform actions, comprising:
receiving a voice input from a passenger in a vehicle;
receiving a gesture input and a gaze input from the passenger in the vehicle, wherein the gaze input of the passenger includes an object in a surrounding environment and an associated focal plane for the object, wherein the gaze input of the passenger is indicative of where the passenger is looking;
determining directives based on the voice input, the gesture input and the gaze input;
associating the directives with the surrounding environment of the vehicle;
generating augmented reality graphical elements based on the directives and the association of the directives with the surrounding environment of the vehicle; and
displaying, for a driver of the vehicle, the augmented reality graphical elements on a heads-up display system of the vehicle using an actuator to move a projector based on a location of the object in the surrounding environment to project the augmented reality graphical elements at the focal plane associated with the object, wherein the augmented reality graphical elements are displayed at the focal plane associated with the object from the gaze input of the passenger where the passenger is looking.

16. The non-transitory computer readable-storage medium of claim 15, comprising generating visual directive data by correlating the gesture input and the gaze input.

17. The non-transitory computer readable-storage medium of claim 16, wherein associating the directives with the surrounding environment of the vehicle comprises determining locational coordinates of the vehicle with respect to objects in the surrounding environment of the vehicle.

18. The non-transitory computer readable-storage medium of claim 17, wherein associating the directives with the surrounding environment of the vehicle comprises determining characteristics of the objects in the surrounding environment of the vehicle.

19. The non-transitory computer readable-storage medium of claim 18, wherein generating the augmented reality graphical elements comprises evaluating at least one of a plurality of rules based on at least one of the directives, the location coordinates of the vehicle with respect to objects in the surrounding environment of the vehicle, and the characteristics of the objects in the surrounding environment of the vehicle.

20. The non-transitory computer readable-storage medium of claim 19, wherein displaying the augmented reality graphical elements on the heads-up display system of the vehicle comprises positioning the augmented reality graphical elements spatially and contextually with the surrounding environment of the vehicle as shown through the heads-up display.

* * * * *